July 18, 1939.  I. KNIGHT  2,166,723
CUTTER BAR ATTACHMENT
Filed Aug. 12, 1938   2 Sheets-Sheet 1

Inventor
Ivan Knight

By Clarence A. O'Brien
and Hyman Berman

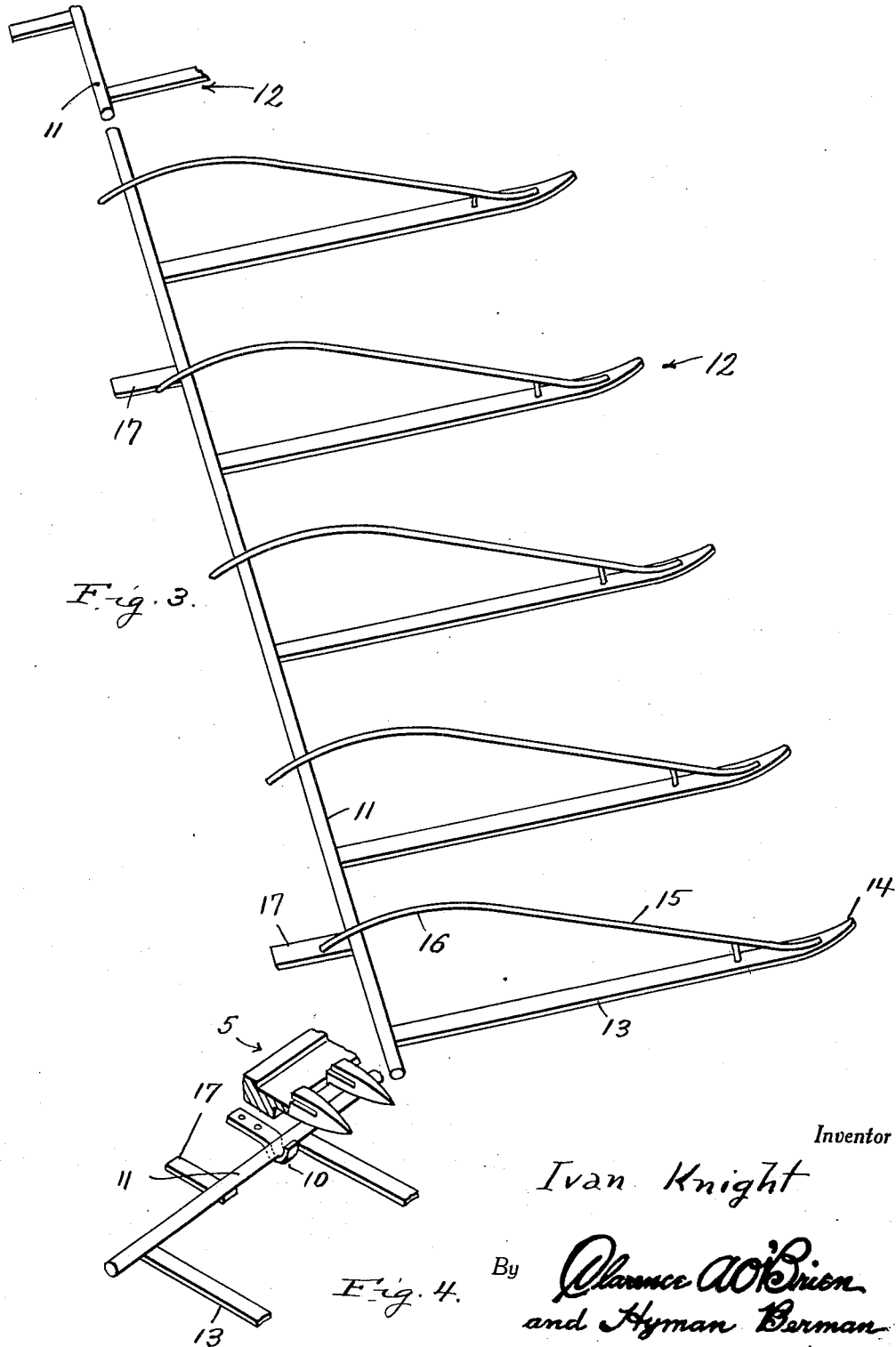

UNITED STATES PATENT OFFICE 2,166,723

CUTTER BAR ATTACHMENT

Ivan Knight, Mayfield, Kans.

Application August 12, 1938, Serial No. 224,629

2 Claims. (Cl. 56—312)

This invention relates to an improved attachment for use in association with an agricultural sickle bar construction, the attachment being utilized for lifting and feeding grain and the like into effective position to be severed by the reciprocatory cutting teeth.

As is evident from the general opening statement of the invention, I am aware that various types of pick-up attachments and so-called lifting fingers have been previously patented and are in use on sickle bar equipped machines. Nevertheless, I have found room for improvement in this structural line of endeavor and have discovered the need for the adoption and use of a successful quick attachable and detachable hinged pickup unit.

The underlying principle of the fundamental object with which I am concerned involves the adoption and use of constantly open hinge forming brackets to accommodate the trunnion-forming rod member of the finger equipped pick-up unit. Moreover, the pick-up unit made in relative small sections so that there are individually available, spring thrust means is eliminated and the construction otherwise simplified to expedite application, use and repair.

Other specific objects, features and advantages will become more readily apparent from the following description and the accompanying illustrative drawings.

In the drawings, wherein like numerals designate corresponding details or elements throughout the views:

Figure 3 is a perspective detail view of one of the lifter units per se.

Figure 4 is a perspective fragmentary detail sectional and elevational view emphasizing the hinge joint mounting from a different viewpoint.

Figure 1:
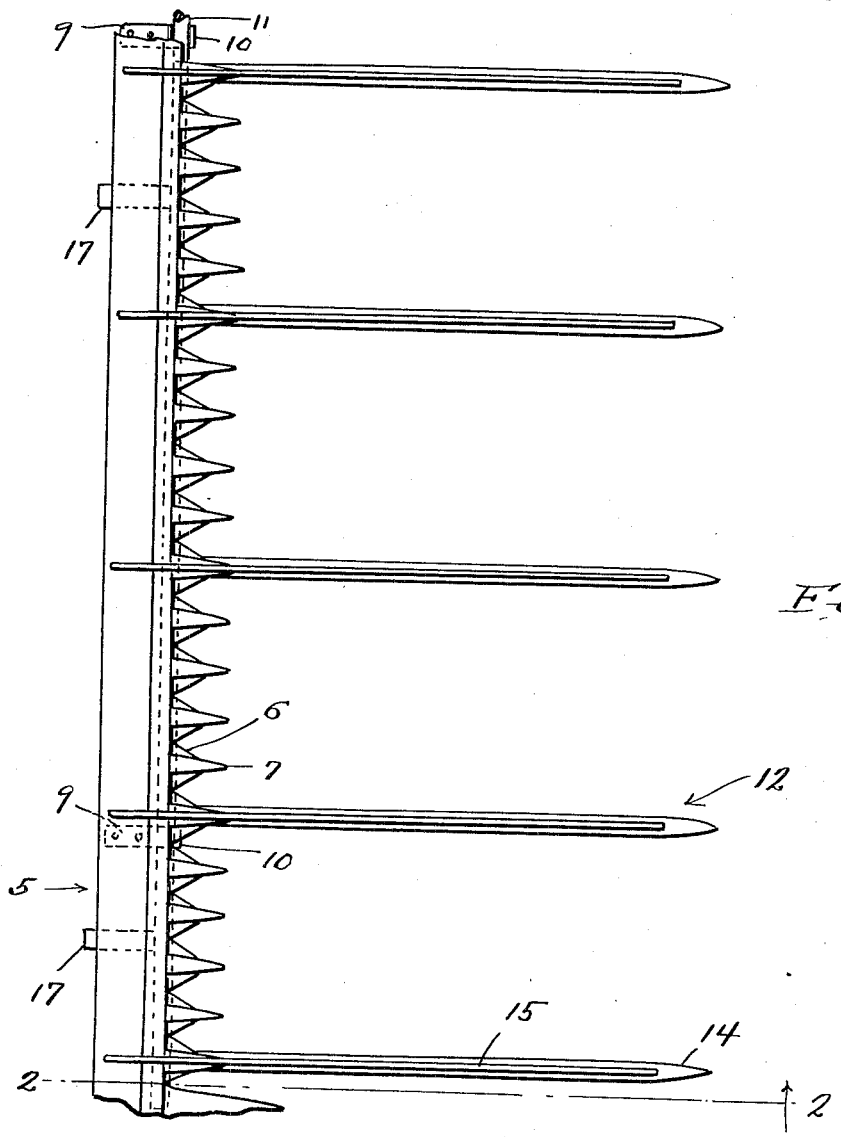
Figure 1 is a fragmentary top plan view showing a portion of the conventional cutter bar, the lifter attachment and the accessories utilized to removably sustain it hingedly in place.
Figure 2:
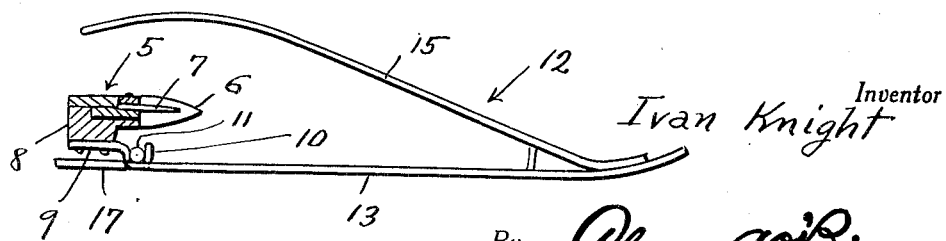
Figure 2 is a section on the line 2—2 of Figure 1.

Referring now to the drawings by distinguishing reference characters, it will be observed that the sickle bar portion of the structure is conventional. The sectional bar portion thereof is denoted generally by the numeral 5 and the stationary teeth are at 6 and the movable cutting teeth are at 7. The lower bar member 8 in accordance with this invention, is provided at longitudinally spaced points with metal brackets 9 and these have corresponding ends projecting beyond and beneath the teeth 6 and 7 where they are formed into hooks 10. These hooks constitute the bearings or seats for the cylindrical bar member 11 forming a salient feature of the lifter unit 12. That is to say, each lifter unit includes one of these bars and it is seated removably and hingedly in the hooks 10 so that it can be inserted and removed with requisite expediency. Customary runners 13 extend at right angles to the hinging and attaching bar 11 and have pointed upturned free end portions 14 to facilitate riding along the ground traversed by the machine. The spring lifting fingers 15 are attached to the pointed ends and extend rearwardly toward the sickle bar where the flexible free end bends 16 substantially overlie the cutting teeth. Also formed rigid with the hinging bar and extending at right angles therefrom are longitudinally spaced check members 17. These project toward and underlie the frame structure 5 and limit the downward swing of the complete unit 12. They also facilitate assembling but are primarily used to carry the unit 12 on the sickle bar structure when the latter is elevated when moving the machine from place to place in the field. That is to say, since the unit 12 hinges downwardly under the force of gravity it is necessary to have some check means to strike against the frame to prevent said unit from swinging down too far and becoming accidentally displaced from the hinging hooks 10.

In many structures now in use the lifting means is one long unit substantially of a length commensurate with the sickle bar construction. It is generally fixedly hinged in place. Under this arrangement there will be two or more of these units 12 and they will be readily applicable and removable. Moreover, in this assemblage the units are substantially self-adapting and leveling and follow the contour of the ground with requisite dependence and nicety. The construction and assemblage arrangement is exceedingly simple, however, and an elaborate description is deemed unessential.

It is thought that the description taken in connection with the drawings will enable a clear understanding of the invention to be had. Therefore, a more lengthy description is thought unnecessary.

While the preferred embodiment of the invention has been shown and described, it is to be understood that minor changes coming within the field of invention claimed may be resorted to if desired.

I claim:

1. In a structure of the class described, in combination, a sickle bar construction including a frame and stationary and movable cutting teeth, a series of longitudinally spaced brackets attached to the under side of said frame and projecting forwardly therebeyond and terminating in seating and hinging hooks, each hook being of substantially U-shape with its opening uppermost and its bight lowermost, a bar removably supported by said hooks, spaced ground engaging runners having their rear ends connected with the bar and the front ends curving upwardly and spring fingers having one end connected with the forward part of each runner, said fingers extending upwardly and rearwardly.

2. In a structure of the class described, in combination, a sickle bar construction including a frame and stationary and movable cutting teeth, a series of longitudinally spaced brackets attached to the under side of said frame and projecting forwardly therebeyond and terminating in seating and hinging hooks, each hook being of substantially U-shape with its opening uppermost and its bight lowermost, a bar removably supported by said hooks, spaced ground engaging runners having their rear ends connected with the bar and the front ends curving upwardly and spring fingers having one end connected with the forward part of each runner, said fingers extending upwardly and rearwardly, and rearwardly extending short members connected with the bar at their front ends for limiting downward movement of the runners by engagement with the under portion of the frame.

IVAN KNIGHT.